Aug. 22, 1967 F. LEE ET AL 3,337,852

INFORMATION HANDLING APPARATUS

Filed June 5, 1964 5 Sheets-Sheet 1

INVENTORS
FRANKLIN LEE
JOHN C. KENT
BY Henry L. Hanson
ATTORNEY

INVENTORS
FRANKLIN LEE
JOHN C. KENT
BY Henry L. Hanson
ATTORNEY

INVENTORS
FRANKLIN LEE
JOHN C. KENT
BY [signature]
ATTORNEY

INVENTORS
FRANKLIN LEE
JOHN C. KENT
BY [signature]
ATTORNEY

INVENTORS
FRANKLIN LEE
JOHN C. KENT
BY Henry L. Hanson
ATTORNEY 3,337,852
Patented Aug. 22, 1967

3,337,852
INFORMATION HANDLING APPARATUS

Franklin Lee, West Acton, and John C. Kent, Lexington, Mass., assignors to Honeywell Inc., Minneapolis, Minn., a corporation of Delaware Filed June 5, 1964, Ser. No. 372,853
15 Claims. (Cl. 340—172.5)

ABSTRACT OF THE DISCLOSURE

Data storage apparatus comprising one or more random access disc files each having at least one rotatable disc adapted to magnetically store items or words of digital data. Each disc is organized, for data storage purposes, in a plurality of uniform angular recording sectors whose sides extend radially across a plurality of concentric recording zones, each zone encompassing a plurality of circular recording tracks and having a track-positionable data transfer head associated therewith. Means are provided, under control of an address code, for concurrently positioning the data transfer heads adjacent a selected and correspondingly situated track in each zone, and for activating a selected pair of the zone data transfer heads during the passage of a prescribed recording sector therebelow. A shift register is provided for the purpose of transferring a digital word to or from the disc. The shift register is arranged to be segmented into two register sections, each of which cooperates with one of a selected pair of zone heads. The relative lengths and shift rates of the register sections are determined in accordance with the selected pair of recording zones so as to optimally distribute the word bits between the two zones within a common angular segment of the disc. When two or more disc files are utilized, circuitry is provided for selecting the disc file which will first be in a position for a desired data transfer.

A general object of the present invention is to provide a new and improved apparatus for manipulating data for storage and retrieval purposes. More specifically, the present invention is concerned with a new and improved apparatus for use with a rotating disc type data storage file which is characterized by the use of minimal circuitry for the addressing and transferring of information with respect to the file and the ability of the apparatus to recover the data or record the data at a substantially uniform rate.

In data processing systems, there is frequently a need to provide bulk data storage apparatus into which and from which it is desirable to transfer information at relatively high rates of speed. One form of bulk storage device that is suitable for use in many applications is the random access disc storage file. This type of file is adapted to rotate continuously and be scanned by suitable data transfer means associated with preselected data storage tracks on the surface of the disc. A typical way of effecting a storage and retrieval function in such a disc file is to have the disc surface covered with a suitable magnetic recording material and with which a data transfer means, such as a suitable electro-magnetic data transfer head, is adapted to record or read back the electro-magnetic impulses or indicia along a particular track adjacent the transfer means. In the larger types of disc files, each disc having a recording surface may have cooperating therewith a plurality of data transfer heads and, depending upon the type of file, these heads may be positionable to a number of different circular tracks on the recording surfaces in the disc file.

In order for a disc file to be effectively used, it is necessary to provide convenient means for moving the information into and out of the disc at a relatively uniform rate so that the associated equipment may be appropriately utilized to maximum effectiveness without loss of efficiency of the disc. In other words, data is frequently manipulated in data processing systems in terms of data words, items or records made up by a predetermined number of bits of information. When a particular word is to be stored or to be retrieved, optimum design can be achieved if the time allotted for the manipulation of the word is relatively uniform. The difficulty of achieving uniformity in a disc file will be readily apparent when it is noted that the relative rates of speed of the circular data storage tracks past a transfer means will vary in accordance with the distance of the track from the rotating axis of the disc. Thus, the surface of the disc at its outer periphery will be moving at a much higher rate of speed than a corresponding angularly positioned point on a track near the central axis of the disc. Another factor that must be taken into account in such a disc file is the fact that the packing density of the individual bits of information will have certain practical limitations. Thus, if the optimum packing density is achieved by recording data at a predetermined frequency in the outer tracks of the disc, the use of the same frequency on one of the inner tracks will result in the packing density exceeding that which can be tolerated. In accordance with the principles of the present invention, the disc file has been uniquely organized so that the data may be recorded or retrieved from the disc at a relatively uniform rate regardless of the particular circular track which may have been selected.

It is accordingly an object of the present invention to provide a new and improved disc file system for storing digital data wherein items or words of information, regardless of where it is stored on the disc file, may be recovered at relatively uniform rates of speed.

The effective use of a disc file as a storage medium is also dependent in part upon the ability to have ready access to any word or item of information in a minimum of time. It has been found that the optimizing of the rate of recovery of a particular item or word must be balanced somewhat by the provision of a simple addressing scheme that will assure the selection of the desired location for data to be recorded or retrieved from the disc. In order to effect the optimization in this area in the present invention, the disc face has been divided into a plurality of sectors, each of which is defined at its boundaries by radial projections from the rotating axis of the disc. In addition, the circular tracks extending outwardly from the central access of the disc are arranged in zones. It will be apparent that with the disc face divided in this manner, the length of any circular track between the sector boundaries in any particular zone will vary in accordance with the distance of that track from the central axis of the disc. As taught by the present invention, each item or word that is to be manipulated is divided into at least two segments such that one segment of the word or item is recorded in one zone and the remaining portion is recorded in a further zone. Thus, when a word is to be recorded in a given sector, a larger portion of the word will be recorded in an outer zone while a smaller portion of the word will be recorded on one of the inner zones. This arrangement will assure that the data representing any word or item may be recovered within a relatively uniform time frame related to the angular velocity of the constantly rotating disc.

It is therefore a further object of the present invention to provide a new and improved disc storage apparatus wherein a disc file is arranged for data storage purposes with a plurality of uniform angular sectors projecting across a plurality of circular and outwardly extending zones, each of which encompasses a plurality of circular data transfer tracks.

Still another object of the present invention is to provide a new and improved disc file apparatus wherein a data word of uniform length is adapted to be stored in a pair of zones by dividing each data word into two segments with the length of each of the two segments being variable in accordance with the particular zones where the data word is to be stored.

A still further object is to provide an apparatus as set forth in the foregoing objects wherein the rate of data transfer in the selected pair of zones varies in accordance with the pair of zones selected.

In a system incorporating the features of the present invention set forth above, it is possible to efficiently utilize the apparatus in connection with a multiplicity of disc files working in combination with a single central data processor. In a multiple disc file combination, it is sometimes desirable to find information in a number of different disc files without particular regard as to which disc file is first utilized. As the individual disc files are rotating, there is a certain latency time between the time that a control order with an address signal appears and the time that a particular sector, which has been addressed, is moved under the recording head. Inasmuch as a multiplicity of disc files will be each operating asynchronously, the latency in the different files will vary in accordance with the particular positions of the respective discs and their recording heads at any one instant. By organizing each of these files in the sector distribution arrangement as taught by the present invention, it is possible to provide a simple means for effecting optimum time use of the disc files. This can be achieved by storing the current sector position in each of the disc files and checking the desired location in each of the disc files at any one instant so that the first disc file selected in any multiple disc file search operation will be the disc file whose desired sector will be next up for a transfer operation.

It is therefore a still further object of the present invention to provide a new and improved apparatus for use with a plurality of separate disc files each of which is subject to a transfer operation wherein the selection of any particular disc file will be dependent upon the disc file whose desired sector will next be in a transfer position.

Another feature of the invention relates to the special shift register utilized in conjunction with the distribution of the individual words transferred with respect to each individual disc. This shift register is so arranged that it may be shifted during the reading or writing process at different rates of speeds over different lengths of the shift register in accordance with the particular zones that are selected for a reading or writing operation. This has been accomplished in the present invention by a unique arrangement of logical circuitry for effecting the desired input of shift signals and interconnection of the circuits within the register so that the desired transfer can be accomplished to provide the divided word at the appropriate time relationship required with respect to the disc file.

It is therefore a still further object of the invention to provide a new and improved shift register circuit that is adapted to operate in combination with a sector organized disc file wherein the shift register is adapted to be divided into a plurality of segments in which a serial transfer may be effected at different rates of speed at the same time in different segments of the register.

The foregoing objects and features of novelty which characterize the invention, as well as other objects of the invention, are pointed out with particularity in the claims annexed to and forming part of the present specification. For a better understanding of the invention, its advantages and specific objects attained with its use, reference should be had to the accompanying drawings and descriptive matter in which there is illustrated and described a preferred embodiment of the invention.

Figure 1:
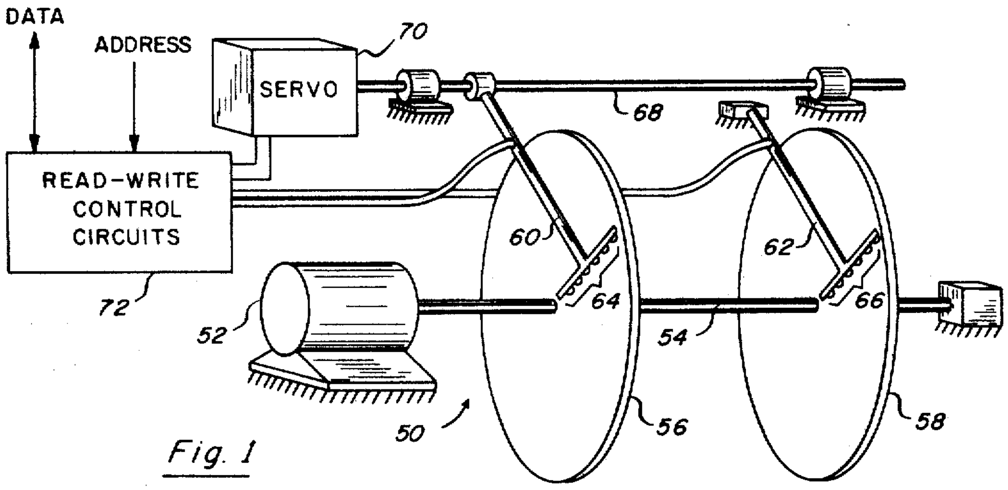
FIGURE 1 is a diagrammatic showing of the major elements of a disc file system in which the present invention is adapted to be utilized.

Referring first to FIGURE 1, the numeral 50 identifies the basic electro-mechanical parts on a disc file used for data storage purposes. This disc file includes a drive motor 52 which is adapted to be driven by suitable power source, not shown. which will drive the motor at a substantially constant rate of speed. The motor 52 is connected by way of a drive shaft 54 to a pair of discs 56 and 58. These discs are adapted to have at least one side thereof formed as a flat planar surface on which is coated a suitable data storing material. In the preferred form of the invention, the storage medium on the surface of the disc file was a coating of magnetic material.

In order to effect a data transfer with respect to the surface of the discs, there are provided a pair of data transfer head carrying arms 60 and 62, each arm of which carries a bank of data transfer heads 64 and 66, respectively. The arm 60 is adapted to be positioned by way of a shaft member 68, the latter of which is controlled in its position by a servo mechanism 70. The arm 62 is adapted to be fixed in position with the heads cooperating with fixed control and address tracks. The apparatus described thus far, insofar as the disc file 50 is concerned, may take the form of a commercially available disc file, such as a Bryant Series 4000 file.

The control of the disc file 50 may be effected by way of suitable read-write control circuits indicated generally at 72, such circuits including means for receiving and transmitting data with respect to some external utilization circuitry. Such circuits also provide inputs for responding to address data required for the positioning of the servo 70 and other data required to locate particular areas on the surface of the disc 56. For purposes of describing the present invention, it is hereafter assumed that the disc 56 is the disc used for storing data while the disc 58 is used for providing address and timing signals for the read-write control circuits 72.

Figure 2:
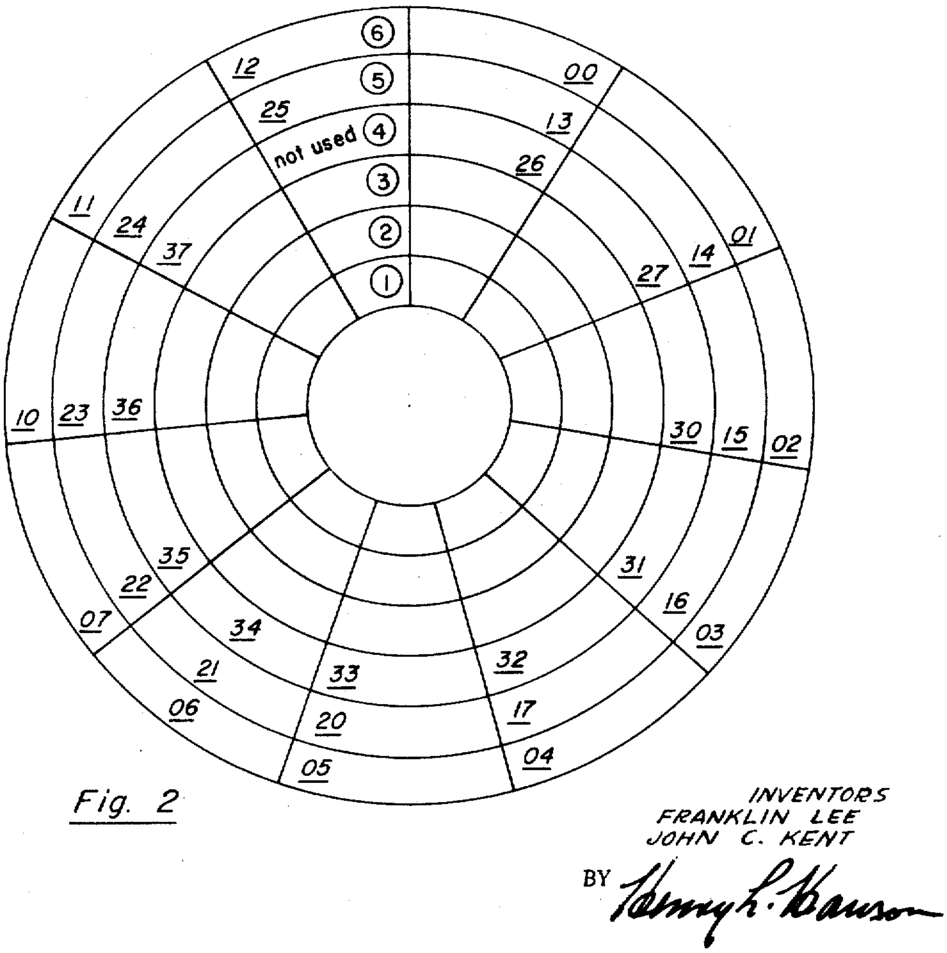
FIGURE 2 illustrates a preferred form of layout for the information on the face of a disc file element.

Referring next to FIGURE 2, there is illustrated here the preferred organization of the data on the disc 56. The numerals 1 through 6 identify six separate recording zones, each of which comprises a circular path whose center corresponds to the center of the file element. The zones extend outwardly from the inner zone 1 to the outer zone 6. In one embodiment of the invention, the number of individual recording tracks within each zone was 128. The servo mechanism 70, illustrated in FIGURE 1, is adapted to position the arms 60 and 62 so that one track out of the 128 within each zone will have a data transfer head associated therewith as the disc is rotating.

The disc face is further divided into a plurality of sectors. As illustrated, there are a total of 11 sectors with each sector comprising an angular or pie-shaped area whose sides are formed along radial extensions from the center of the disc. For addressing purposes, the sectors are identified by an octal code shown by the arabic numerals 00 through 37.

In one form of the present invention, the data manipulated is preferably in the form of a fixed length record or item. Each item or record contains 64 words and each word contains 54 bits of information. The arrangement of each record or item of information on the disc will be understood by reference to FIGURE 3 wherein a single sector of the disc is illustrated showing the zones 1 through 6. Each sector is effectively divided into a plurality of word sectors or spaces. It will thus be noted that the track length within zone 1 will be substantially less than the track length within zone 6 within the limits of the sector boundaries. Similarly, a word space within zone 1 will also be relatively small by comparison to the corresponding word space in the zone 6. For this reason, it was found desirable to organize the data to utilize a common sector boundary on all zones and then transfer each word or item within a relatively fixed time interval insofar as disc rotation is concerned, regardless of where the data may be stored on the disc. To accomplish this end, zones 1 and 6 are utilized together as a unit insofar as each word is concerned. In order to maintain synchronization between the pair of zones being utilized, a single clock track is used for both zones. The frequency of the inner zone is always a sub-multiple of the frequency of the outer zone. Thus, with a 54 bit word, 40 bits of the word are stored in zone 6 while 14 bits of the word are stored in zone 1. Two filler bits are used in zone 6 to maintain the exact frequency relationship between the two zones. Similarly, zones 2 and 5 are arranged to cooperate together. In zone 2, 18 bits of the 54 bit word are adapted to be stored while 36 bits of the word will be arranged for storage in zone 5. Insofar as zones 3 and 4 are concerned, in view of their being immediately adjacent to each other, it is convenient to arrange for the word to be split with 27 bits in each zone.

In a preferred embodiment of the invention, a total of 64 words were arranged to appear within the limits of each sector along each pair of tracks. At the end of the 64th word, and prior to the start point of the next sector, a gap is provided that is referred to as the "inter-record gap." It is within this particular gap that the sector address is recorded for the next sector that is to pass under the data transfer heads.

It will be apparent that the zones may well be subdivided further than that illustrated with the bits arranged with different divisions from those illustrated in order to carry out the principles of the invention of having each item, word or record stored or retrieved in a substantially fixed period of time regardless of where it is stored in the disc file.

In a preferred embodiment of the invention, each sector within zones 4, 5 and 6 was separately addressable. Inasmuch as zones 1 and 6 operate together, it will be apparent that an address for zone 6 will serve also for purposes of selecting zone 1. Similarly, the selection of zone 5 will carry with it a corresponding selection of zone 2. Zones 4 and 3 are likewise addressed by a common address signal. Each of the 32 sectors on a disc surface is uniquely defined by five binary bits. These five bits are decoded to give the sector address and signals to activate the proper pair of read-write heads in the selected zone-pair, as more specifically described below.

Figure 4:
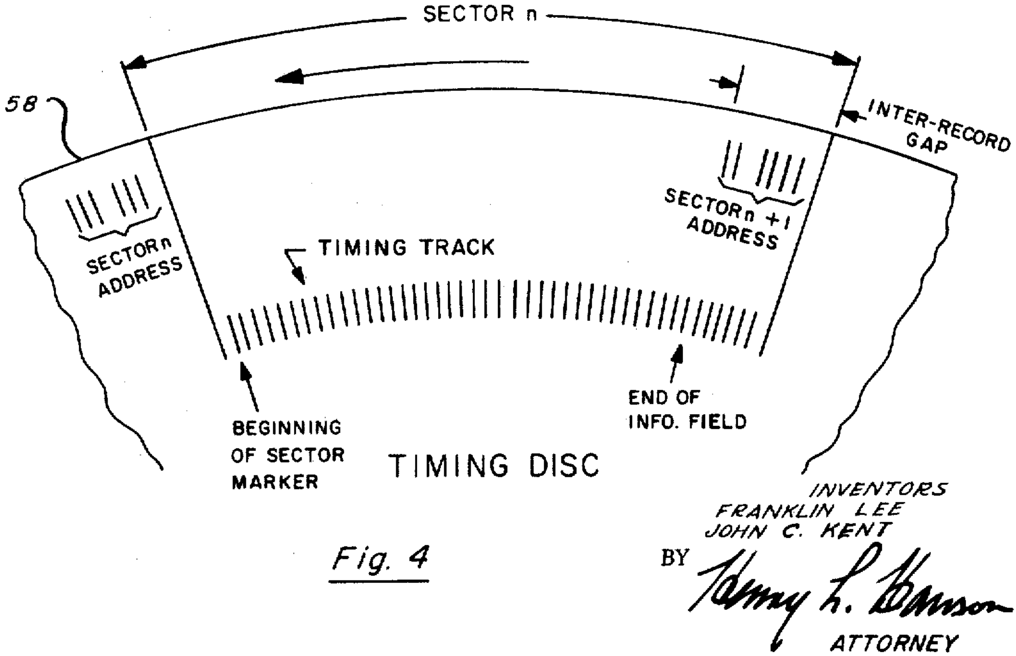
FIGURE 4 illustrates the timing and address signals that may be utilized with the present invention.

Illustrated in FIGURE 4 is a segment of a representative timing disc that may be used for purposes of providing sector address signals and timing signals utilized in the data storage file. The timing disc may well be the disc 58 as shown in FIGURE 1. In the timing disc illustrated, the sector address *n* is arranged so that the address for the sector will appear at a suitable data transfer head, not shown, prior to the time that the information from that sector is adapted to pass under the data transfer head. Thus, the sector *n* address will be read from the timing disc. If the sector address *n* is the one that is being searched for, the apparatus to be described hereinafter responds thereto to indicate that the desired sector will be the next one to pass under the transfer heads.

The particular code selected to identify the sector address will be dependent upon the size of the disc file and the number of sectors employed. In one particular embodiment with which the present invention was associated, a four bit address was utilized for identifying the sector. In addition to the four bits identifying the sector address, an additional parity bit was included for checking purposes. The sector address was, in turn, bracketed by a pair of "one" bits for purposes of uniquely identifying the location of the sector address. Thus, a total of seven bits were associated with each sector address. Following the address, a suitable "beginning of sector" signal appears and indicates that the desired data transfer in the data disc may be started. The timing of the transfer with respect to any particular zone will be dependent upon the particular zones being utilized. A timing track within the sector limits is illustrated in FIGURE 4 and may also be read by a suitable transfer head.

As illustrated in FIGURE 4, as the timing disc continues to rotate, the address for the next sector, sector $n+1$, will be read and a comparison made to determine if any reading or writing is to take place with respect to the next sector.

In one embodiment of the invention, the timing signal associated with zone 6 was 468 kc. The timing signal associated with zone 5 was 401 kc. while the timing signal associated with zone 4 was 301 kc.

Figure 5:
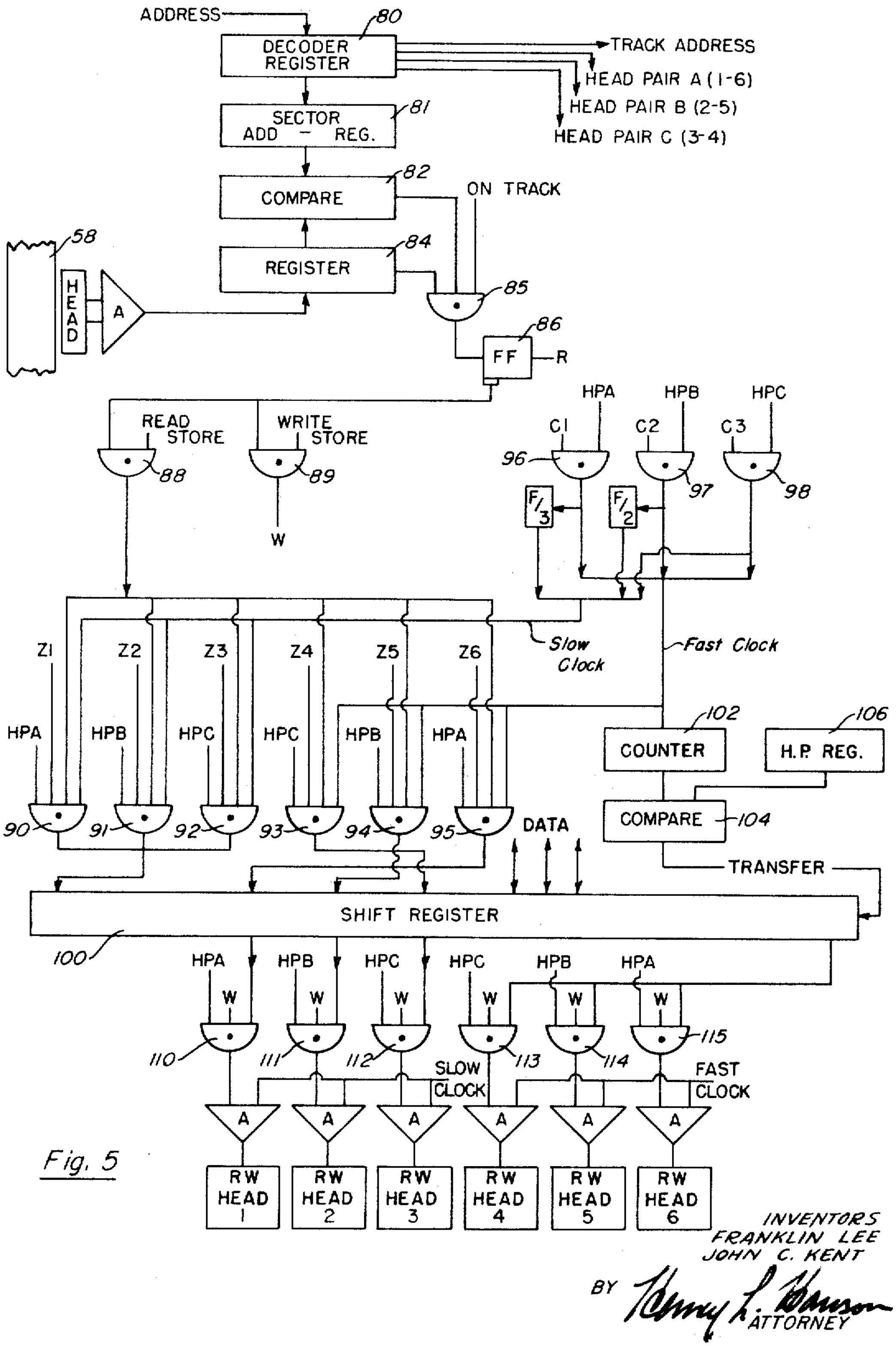
FIGURE 5 illustrates representative control circuitry and logic for implementing the principles of the present invention.

Representative apparatus for utilizing and controlling the signals associated with the disc file are illustrated in logical diagrammatic form in FIGURE 5. In operating the disc file, it is necessary to recognize the presence of an address specifying a storage location on the associated data disc file. For this purpose, there is provided a decoder register 80 which is adapted to receive the input address from some suitable external data processing apparatus, not shown. The address may be in the form of a plurality of coded bits representing the particular sectors and zones desired on the data disc file, as illustrated in FIGURE 2. Output signals from the register 80 will indicate the circular zone desired as well as the track signal for the track to be selected within the selected zone. The track signals will be fed directly to the servo 70 shown in FIGURE 1, so that the servo will position the data transfer heads on the disc 56 to the desired track location. The zone outputs from the register 80 in the form of the Head Pair Signals A, B and C will serve to condition selected gates for purposes of directing the timing signals and the data signals once the desired storage position on the disc has been located.

The sector address bits in the register 80 are stored in a sector address register 81 and then applied to a comparison circuit 82, the latter of which receives, as a further input, signals from a location register 84. The location register 84 receives its signals from the clock disc 58 and the read head associated therewith. As the address is read from the disc defining the sector next to come under the data transfer heads, the register 84 will contain this information and the data will be applied to the comparison circuit 82. When a comparison is made, there will be an output signal from the comparator 82 which is applied to a control gate 85. This latter gate will produce an output when an "on track" signal is present and a "compare now" signal is received from register 84. When operative, the gate 85 will set a suitable storage circuit, such as a flip-flop 86. Once the flip-flop 86 has been set indicating that the sector has been found, such signal will be applied to gates 88 and 89 to condition one gate leg on each of the gates. The other gate leg of each of the gates 88 and 89 is adapted to be activated by a stored Read signal or a stored Write signal.

The output of the gate 88 is coupled to an input gate leg of a series of read gates 90 through 95. These gates are adapted to be rendered operative in a selective manner in accordance with the particular zones from which data is being read. The selection of the zone will be dependent upon the head pair signals received in decoder register 80. Thus, gates 90 and 95 will each receive an additional activating signal when the head pair signal HPA is received as a further input. In addition to the head pair signals on the gates 90 through 95, there is a further input from the read heads associated with each zone, Z1 through Z6. A still further signal received on the gates 90, 91 and 92 will be the "slow clock" signals. The gates 93 through 95 will have applied thereto the "fast clock" signals.

The slow and fast clock signals are derived from the clock disc 58 by way of a series of control gates 96, 97 and 98. A clock signal C1 is associated with the timing of the signals in zones 1 and 6 and consequently this clock signal is adapted to pass through the gate 96 when the signal HPA is present. Similarly, the gate 97 will pass the clock signal C2 for zones 2 and 5 when the head pair signal HPB is present. The gate 98 will be activated to pass the clock signal C3 when the head pair signal HPC is present. Associated with the output of the gate 96 is a frequency divider F/3 which is adapted to divide the clock frequency C1 down to one-third of the basic clock frequency. A further frequency divider F/2 is connected to the output of the gate 97 for purposes of dividing the clock signal C2 in half. The frequency dividers each provide the slow clock signal used in the apparatus. The straight outputs from the gates 96 through 98 provide the fast clock signals and the gate 98 also has its output connected to the slow clock for the reason that the same frequency is used in connection with the head pair C.

The outputs from the gates 90 through 95 are coupled to the main shift register 100 depending upon which combination of the read gates are activated. The reading of serial information will be accomplished by a serial shifting into the register 100 until such time as the register has been loaded with a word. In order to determine when a word has been loaded, a counter 102 is connected to the fast clock output to indicate when a particular bit count has occurred. To determine if any particular bit count represents the completion of a word transfer, a comparison circuit 104 is provided which receives a further input in the form of a code representing the head pair that has been selected. This code is stored in the head pair register 106. Once a comparison signal has been produced by the circuit 104, this indicates that a transfer must be made with respect to the shift register 100. In the case of a preferred embodiment of the invention, the transfer from the register 100 may be a direct parallel transfer to external utilization circuitry, not shown.

In connection with the writing of data in the disc file, the register 100 will first have a word loaded therein and then the words will be transferred out serially in accordance with the selected zones on the associated disc file. The writing circuitry is controlled by a series of write gates 110 through 115. Each of these gates is adapted to be conditioned by a write signal W and an associated head pair signal HPA, HPB or HPC. The gates are in turn coupled to their associated read-write heads by way of amplifiers A, the latter of which are clocked, for heads 1, 2 and 3 by way of the slow clock. The amplifiers and the outputs of the gates 113, 114 and 115 are clocked by way of the fast clock signal and are connected to heads 4, 5 and 6 respectively.

In considering the operation of the overall apparatus discussed and disclosed thus far, it should be first noted that when the apparatus is put in operation, the motor 52, in FIGURE 1, will be suitably powered so as to drive the discs 56 and 58 at a substantially constant rotational speed. The speed selected in the Bryant 4000 series disc file, referred to above, is 900 r.p.m. This will mean that the head assemblies 64 and 66 on the discs 56 and 58 respectively will be passing over, on a continuing basis, all of the information and clocking signals located in the tracks immediately adjacent the respective heads in their positions on their respective discs.

When an address signal is received in the read-write control circuitry 72, the servo-mechanism 70 will be operative, by way of the positioning shaft 68 and the arm 60, to move the head assembly 64 to the desired track location which will correspond to the track address bits carried in the input address. This address and positioning control mechanism may be that as utilized in the Bryant Series 4000 disc file.

In addition to providing the bits for positioning the servo 70, the address bits fed into the register 80, FIGURE 5, will provide signals for identifying a particular zone with respect to which a data transfer is to take place. As the disc file rotates, the clock disc will be scanned by the read head associated therewith to read each sector address, as discussed above in FIGURE 4. As the sector address is read, it is applied to the register 84 so that there may be a corresponding sector address comparison made with the sector address stored in the sector address register 81. As soon as there is a matching of the sector addresses in the registers 81 and 84, the compare circuit 82 will be operative to produce an output. If the head in the data disc has been positioned on the desired track, an "on-track" signal will appear on the gate 85 and the "compare now" signal from the register 84 will condition the gate 85 so that it will be active and a signal will be applied to the flip-flop 86. The setting of the flip-flop 86 provides an activating signal for the gates 88 and 89. The activation of the input gate legs to the gates 88 or 89 will indicate that the desired sector has been reached and that a data transfer may be effected.

In the case of a read operation, that is an operation wherein data is to be read from a particular sector location, the read will be effected with respect to the desired zones as specified by the output signals from the decoder register 80. Thus, if the head pair signal HPA is present on the output of the decoder register 80, this will signify that zones 1 and 6 are to be used in the data transfer. Thus, with a read operation taking place, the read store signal will be active on the gate 88 so that the output line of this gate will be applying an activating signal to an input gate leg for the gates 90 through 95. Similarly, the head pair signal HPA will be active on each of the gates 90 and 95. The clocking signal for the gate 90 will be derived from the slow clock output by way of the gate 96 and the frequency divider F/3. The fast clock signal for gate 95 will be derived directly from the output of the gate 96. The data will be coming in from zones 1 and 6 on the lines Z1 and Z6 from the tracks selected within the desired sector. The data from zone 1 will be shifted into the shift register 100 in serial fashion starting at the left end of the register. The data coming in from zone 6 by way of the gate 95 will be shifted into the shift register 100 at the ¼ position point. As soon as the counter 102 has counted 42 fast clock pulses, which corresponds to the shifting in of the 42 bits of the word from zone 6, the count output will correspond to the counts stored in the head pair register 106 so that the comparator circuit 104 will produce an output transfer signal. This transfer signal will shift the word from the register 100 to some external source by way of a parallel shift and the circuit will be conditioned to receive another word from the input reading gates. This operation will repeat until such time as the 64th word has been read in the sector and the end-of-field signal has been received to reset the circuit to its initial position, as by resetting the flip-flop 86.

A further reading or writing operation cannot take place until such time as there again is a comparison of an input address with an address that is read so that the appropriate read gate 88 or the write gate 89 is activated to indicate that the desired sector has been reached.

In the event that a write operation is to take place, the addressing process will take place as described above in connection with the read operation. As soon as the write gate 89 has been activated, the W signal will activate the appropriate gates associated with the write operation.

If the head pair selected is the head pair A, the HPA signal will appear on the gates 110 and 115. This will mean that the readout operation will take place with the shift register 100 providing the data signals for the input data gate leg of the gate 110 and the input data gate leg of the gate 115. As with the read operation, as soon as a particular word has been read from the register 100 out to the disc by way of the read-write head combination, the counter 102 will be counting the fast clock pulses associated with this transfer and, upon the transfer of the number of bits indicating that the word transfer is complete, the comparator 104 will produce an output signal which will be effective to shift in another word from an external source to the shift register 100 for a further readout to the disc file.

It will be apparent from the foregoing description that the present apparatus has been arranged to make optimum use of the data storage surface of the disc file in terms of recovering and recording data in the disc file in an optimum manner. Further, the apparatus has been arranged so that the location of any particular surface in the disc file may be realized with a minimum of hardware. It will be readily apparent to those skilled in the art that the principles of the present invention may readily be applied to a disc file having defined thereon a larger number of zones and a larger number of sectors. In such an event, the zone combinations will vary in accordance with the selected zones. The frequencies selected for clocking the data transfers within the zones will also vary accordingly.

Figure 6:
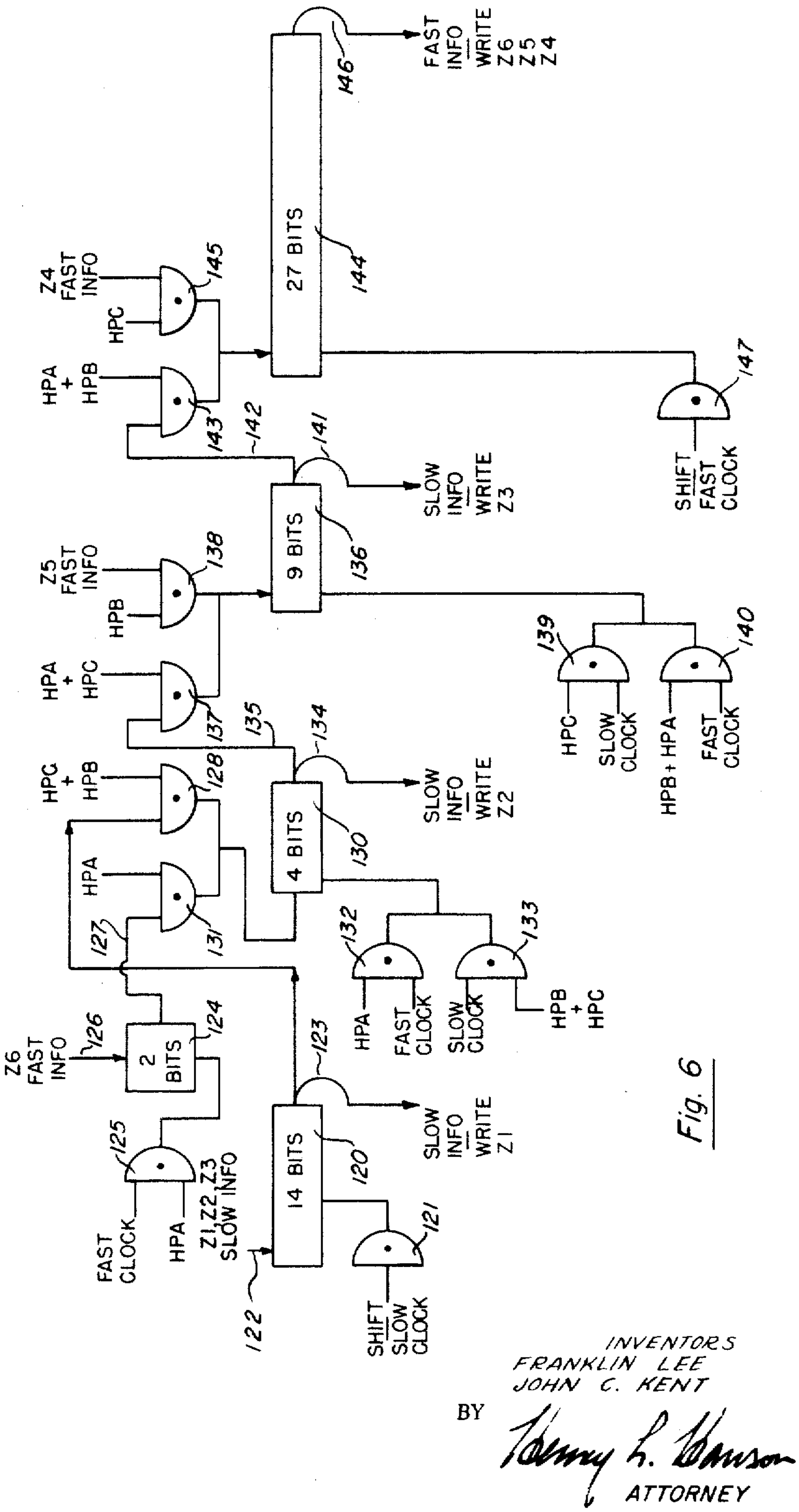
FIGURE 6 illustrates in detail the main register circuit that may be used with the present invention.

The main shift register 100, shown in FIGURE 5, is shown in greater detail in FIGURE 6. The register shown in FIGURE 6 is divided into a series of sections. The first section 120 is a section which is adapted to store 14 bits of information. The shift signals for this particular section 120 are derived from the slow clock and are applied thereto by way of a control gate 121. Slow information is adapted to be read and stored in the register section 120 from zones 1, 2 or 3 by way of an input line 122. Slow information is adapted to be written from the output end of the register 120 into zone 1 by way of an output line 123.

A further section of the register 100 is a two bit section 124. This particular section is utilized only in connection with zone 6, for the reason set forth above. The shifting of this particular register section is controlled by a gate 125 which receives a fast clock input signal and a head pair signal HPA. Zone 6 is the source of the input information for this two bit register by way of an input line 126.

The output of the two bit register section 124 is by way of an output line 127 which is connected to an input gate 131 leading to a further register section 130. The gate 131 is adapted to be activated when the head pair signal HPA is present. Also connected to the input of the four bit register section 130 is a further input gate 128 which derives its data signals from the output of the register section 120. The gate 128 will be activated whenever the head pair signal HPB or HPC is present. The shift signals for the register section 130 are derived from a pair of gates 132 and 133. The gate 132 is used to control the application of a fast shift pulse by way of a fast clock signal whenever the head pair signal HPA is present. The gate 133 controls the application of a slow clock pulse, thereby slow shift pulse, whenever the head pair signals HPB or HPC are present.

The output from the register section 130, on output line 134 leads to zone 2 write circuits and is adapted to provide slow information for zone 2. The other output of the register section 130 is by way of line 135 and this output is adapted to be applied to the input of a further register section 136 by way of a control gate 137. The gate 137 is adapted to be activated whenever the head pair signals HPA or HPC are present. Fast information is also adapted to be applied to the register section 136 from zone 5 by way of a further gate 138, the latter of which receives a control signal representing the head pair signal HPB.

The shifting signals for the register section 136 are provided by a pair of control gates 139 and 140. The gate 139 is adapted to provide the slow shift signals as derived from the slow clock upon the presence of head pair signal HPC. The gate 140 is adapted to provide the fast shift signals, as derived from the fast clock, whenever the head pair signal HPA or HPB is present. The output of the register section 136 is by way of a pair of lines, the first of which provides slow information on line 141 for application to the zone 3 writing head. The other output line 142 is used to supply information to a control gate 143, the latter of which is connected to the input of a further register section 144. The gate 143 is adapted to be activated whenever the head pair signal HPA or HPB is present. The data signals are also provided for the register section 144 by the further input gate 145, the latter of which has an input fed with information from zone 4 and a control input representing the head pair signal HPC. The output from this particular register section is by way of an output line 146, said section providing write signals for the zones 4, 5 and 6. The shifting of the signals for the register section 144 is provided by way of the control gate 147 which derives its input from the fast clock.

Figure 3:
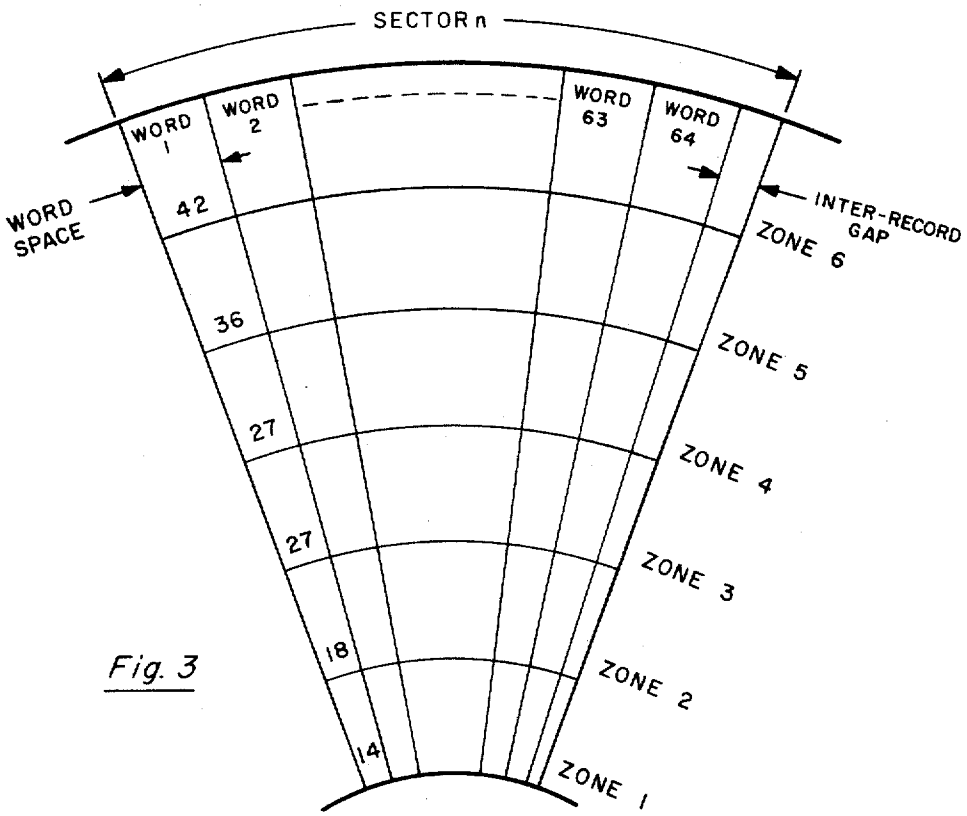
FIGURE 3 illustrates a preferred layout for a sector of a disc file element.

Considering the operation of the register 100, reference should be made first to FIGURE 3 wherein the relative bit relationships for each word in the storage disc are set forth. As pointed out above, zones 1 and 6 work in combination so that a complete word will be made up of the 14 bits from zone 1 and the 42 bits from zone 6. Thus, if data is to be read from the disc such that zones 1 and 6 are to be used, the head pair signal HPA will be active, as provided by way of the decoder register 80, in FIGURE 5. With the signal HPA active, the control gates 125, 131, 137 and 143 will be active. Thus, as a word starts to come into the register in a reading operation, the zone 1 information will come in by way of the input line 122 and will be fed into the register section 120 at a rate determined by the slow clock input signal fed by way of the gate 121. Inasmuch as the register section 120 is a 14 bit register, all of the information from zone 1 will be stored in this particular section when the reading operation is complete.

At the same time that the slow information is coming in from zone 1, the fast information will be coming in from zone 6 by way of the input line 126 on input register section 124. The fast information coming through the register section 124 will be coupled to the gate 131 and then to the four bit register section 130. From there, the data will flow on the output line 135 through the gate 137 into the register section 136. The output of the register section 136 will then be coupled by way of the output line 142 and gate 143 into the input of the register section 144. Consequently, at the end of the read operation in this example, 42 bits will be stored in the register starting with the two bit register section 124 and ending with the register 144. The rate at which this information is shifted into this fast portion of the register will be in accordance with the fast clock signals as gated by the control gates 132, 140 and 147.

When information is to be written from the register, the same procedures will be followed in acordance with the particular head pair signals selected to represent the zones in which the writing is to take place. Thus, if a word is to be written in zones 2 and 5, the head pair signal HPB will be active and the presence of the signal will activate the associated control gates in FIGURE 6. Thus, the control gate 133 and the control gate 140 will be activated for purposes of supplying a slow shift signal to the register section 130 and a fast shift signal to the register section 136. At the same time, the gates 121 and 147 will be respectively supplying slow shift signals to the register section 120 and fast shift signals to the register section 144. With the control signal HPB present, the register data flow control gates 128 and 143 will be activated. With the gate 128 activated, data from the register section 120 will flow through the gate 128 into the register section 130 from whence it flows on the output line 134 to the write amplifier associated with zone 2. In a similar manner, the data in register section 136 is fed through gate 143 into register section 144. The output of this section 144 is by way of the output line 146 and this will be made available to the write circuitry in zone 5, as determined by the gating circuits illustrated in FIGURE 5.

It will be apparent that a reading and writing operation with respect to zones 3 and 4 will be with respect to 27 bits of information in each half portion of the register as represented by the section 144 and the related register sections 120, 130 and 136. The gating of the shift signals will be in accordance with the particular selected head pair and in accordance with whether or not a read or a write operation is being performed.

It will be apparent that the features of this register are such that it is possible to provide for both slow and fast shift operations to be performed simultaneously within the register and with different combinations of sections of the register being associated with slow or fast shifts in accordance with the particular sections that are being used in combination. The flexibility of this register materially enhances the ability of the apparatus to provide varying members of bits at the different transfer rates with respect to the different zones in the data disc being utilized.

Figure 7:
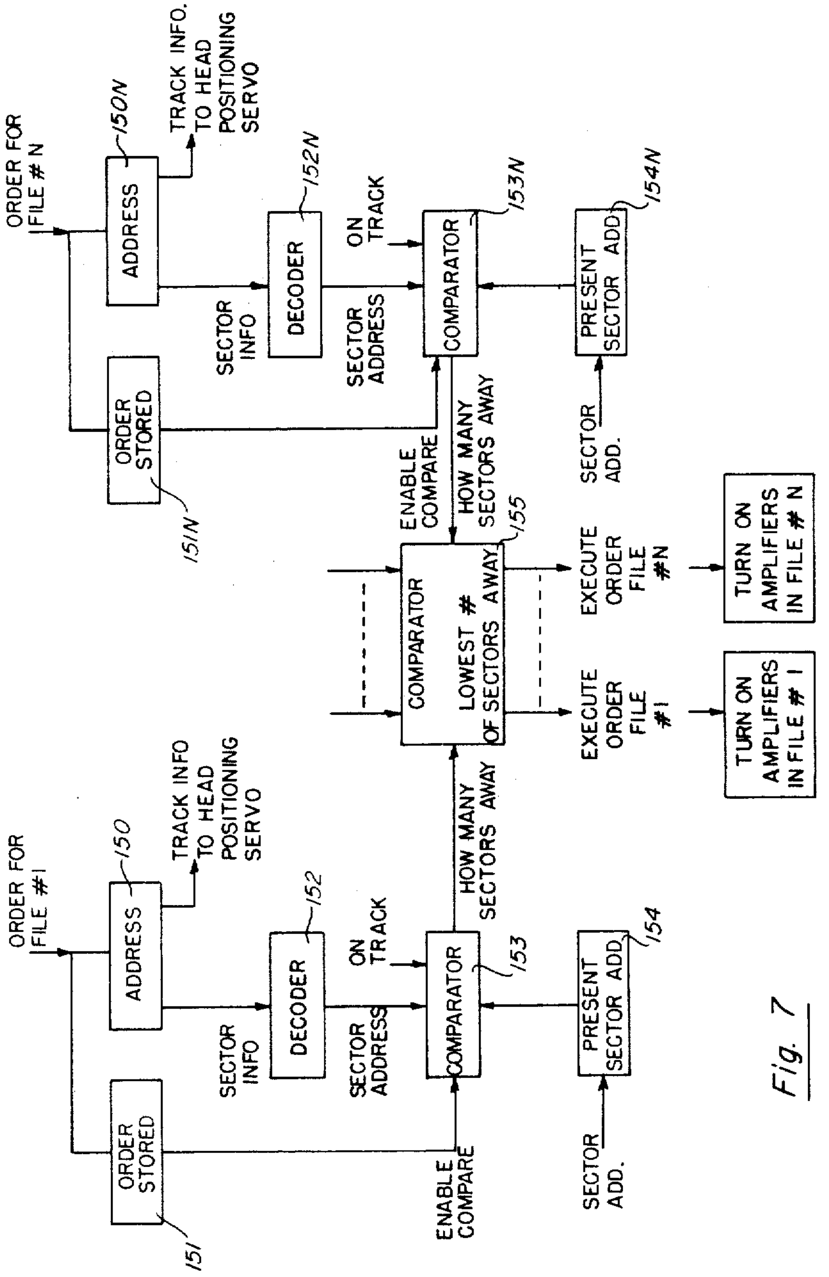
FIGURE 7 is a diagrammatic representation of control logic for a multiplie file apparatus.

In order to take optimum advantage of the apparatus disclosed in FIGURES 1 through 6, insofar as a multiple file operation is concerned, an arrangement such as disclosed in FIGURE 7 may be utilized. When a single file is being used, there is generally an inherent time delay between the time that an input address is received for a desired location and the time that the desired location is reached. This time delay or latency is, of course, dependent upon the relative position of the data transfer heads with respect to the desired location when an input address is received. When a multiplicity of files are being used, the relative latency time between the address received relative to the respective files will be variable inasmuch as the files are operated asynchronously with respect to each other. Consequently, in order to optimize the timing of a multiplicity of files, it is desirable to keep track of the relative positions between the desired addresses and the current location of the data transfer means within each file. By maintaining a current picture of the relative status of each file with respect to the addresses calling for operation within the file, it is possible to sequence the operations in the files so that the file having a minimum amount of latency time will be the first file called into operation.

The apparatus of FIGURE 7 is a diagrammatic representation of the basic logic required for determining which file will first be reaching its desired address location. In FIGURE 7, there is associated with each disc file an input address register 150. The presence of an order for file number 1 will provide the address signals for the register 150, and a signal for setting an order stored circuit 151. The appropriate sector information is read from the address register 150 and is applied to a decoder circuit 152. The head positioning servo, as explained above, is adapted to be controlled by the input address signals so that, when the head has been positioned on the desired track, an "on track" signal will be produced. This "on track" signal and a signal from the order stored circuit 151, are applied as control signals to a comparator circuit indicated generally at 153. Also connected to the comparator 153 is a present sector address register 154, the latter of which is continuously being changed as the head scans the sectors coming up on the associated disc file.

The comparator circuit 153 may take the form of a conventional subtracting circuit which will continuously indicate the difference between the desired address and the current address of the sector under the data transfer heads. This difference signal from the comparator 153 is connected to a further comparator circuit 155. This latter comparison circuit may also take the form of a conventional digital subtractor which will subtract the relative differences coming in from the comparator 153 with respect to one or more other files that may be associated with comparator 155. In its elemental form, the comparator 155 may provide for the subtracting of the digital signals in the comparator 153 associated with file number 1, and the comparator associated with file N. If the difference produced is a negative number, then file 1 will reach its desired location before file N. Conversely, if the difference produced is a positive number, file N will reach its destination prior to the time that the file 1 reaches its desired location. The presence of a negative or positive number may then be used as an "execute order" signal for carrying out the desired read or write operation, as called for by the stored order.

In the event that the comparator 155 is associated with more than two files, the comparator 155 may be provided with storage circuits for storing the indicated differences between selected pairs of files until an ultimate determination is made in accordance with the file found to be closest to its desired location. As the comparison can be accomplished at microsecond, or less, speeds, adequate time is available for this operation since the rotational speeds of the disc are measured in milliseconds.

It will be readily apparent that this arrangement takes full advantage of the sector arrangement of the data on the individual disc files so that a minimum of addressing logic need be associated with the locating of the desired sector and a minimum amount of time spent in finding the desired address location.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

What is claimed is:

1. In combination, a rotating disc data storage element having a planar surface on at least one side thereof on which data is adapted to be stored, said element having on the surface thereof a plurality of circular data storage tracks each of which has a center corresponding to the central axis of said element, said element being further divided in a plurality of sectors each having the sides thereof defined by indicia in each of the circular tracks along a pair of lines extending radially on said element, data transfer means positioned adjacent said element in order to effect a data transfer with respect to data stored on said element or data to be stored on said element in selected ones of the circular tracks on said element, register means for storing an item of data to be recorded or read from said element, means selectively coupling said register means to said data transfer means so that with respect to any data transfer, at least two data transfer means are utilized for any one item of information stored in said register means, and means clocking the operation of said register means and said data transfer means so that the data transferred with respect to said circular tracks will be at a uniform transfer rate.

2. In combination, a data storage disc file comprising a rotatable storage element having a planar surface at right angles to the axis of rotation on which data is adapted to be stored, means defining on said element a plurality of circular data storage tracks each of which has a center common to the rotating axis of said element, data transfer means adapted to be associated with at least a pair of said tracks radially displaced with respect to each other, said data transfer means comprising a pair of data transfer heads adapted to communicate electomagnetically with respect to said tracks at the same time, a pair of data storage registers connected to said pair of data transfer heads, and means connected to shift data within said registers with respect to said heads at rates that vary in accordance with the pair of tracks selected.

3. In a digital data storage apparatus, the combination comprising, a rotatable disc storage file including at least one rotatable disc storage element having a surface extending angularly with respect to the rotational axis thereof on which data is adapted to be stored, said disc storage element being divided into a plurality of zones extending outwardly from the rotational axis on said disc element, each of said zones including a plurality of circular tracks, a data transfer means for each zone and adapted to be positioned adjacent at least one track within said zone, mechanical means for positioning the data transfer means in each zone so that within each zone the data transfer means will be cooperating with respect to a corresponding track in every other zone, a plurality of register means connected one each to each of said data transfer means, a further register adapted to store an item to be manipulated with respect to said disc, means coupling said further register to said register means in accordance with the zones selected for a data transfer operation, said last-named means coupling data with respect to said register means so that the item of data will be divided between at least two registers, and means connected to said registers to shift the data in said registers at a rate corresponding to the selected zone on the disc so that there will be a uniform rate of data flow between said disc and said data transfer means.

4. In combination, a rotating disc data storage element having a planar surface on at least one side thereof on which data is adapted to be stored, said element being adapted to have defined thereon on the surface thereof a plurality of circular data storage tracks each of which has a center corresponding to the central axis of said element, said element being further divided in a plurality of sectors having the sides thereof defined by indicia in each of the circular tracks along a pair of relatively straight paths extending radially on said element, data transfer means positioned adjacent said element in order to effect a data transfer with respect to an item of data stored on said element or data to be stored on said element in selected ones of the circular tracks on said element, register means for storing data to be recorded or read from said element, means selectively coupling said register means to said data transfer means so that with respect to any data transfer, at least two data transfer means are utilized for any one item of information stored in said registers means, and transferred with respect to two circular tracks, means clocking the operation of said registers means and said data transfer means so that the data transferred with respect to said circular tracks will be at a relatively uniform rate, and means coupled to said register means so that the number of bits of data from any one item in said two tracks will appear between points in said circular tracks formed by the intercept of said straight paths on said circular tracks.

5. In combination, a rotating disc data storage element having a planar surface on at least one side thereof on which data is adapted to be stored, said element having defined on the surface thereof a plurality of circular data storage tracks each of which has a center corresponding to the central axis of said element, said element being further divided in a plurality of angular sectors having the sides thereof defined by radial projections extending across said tracks on said disc, data transfer means positioned adjacent said element in order to effect a data transfer with respect to an item of data stored on said element or data to be stored on said element in selected ones of the circular tracks on said element, register means for storing data to be recorded or read from said element, means selectively coupling said register means to said data transfer means so that with respect to any data transfer, at least two data transfer means are utilized for any one item of information stored in said register means, and means clocking the operation of said register means and said data transfer means so that any item of data transferred with respect to said circular tracks will occur within a common angular sector.

6. In combination, a data storage disc file comprising a rotatable storage element having a planar surface at right angles to the axis of rotation on which data is adapted to be stored, means defining on said element a plurality of circular data storage tracks each of which has a center common to the rotating axis of said element, data transfer means adapted to be associated with a pair of said tracks at the same time, said data transfer means comprising a pair of data transfer heads adapted to communicate with respect to said tracks, control means connected to position said heads in response to an address code, a pair of data storage registers connected to said pair of data transfer heads, and means connected to shift data within said registers with respect to said heads at rates that vary with the circular tracks selected, said last-named means comprising means responsive to signals derived from said address code.

7. In a digital data storage apparatus, the combination comprising, a rotatable disc storage file including at least one rotatable disc storage element having a surface angularly positioned with respect to the rotational axis thereof on which data is adapted to be stored, said disc storage element being divided into a plurality of zones extending outwardly from the control axis of said disc, each of said zones including a plurality of circular tracks, a data transfer means for each zone and adapted to be positioned adjacent at least one track within said zone, mechanical means for positioning the data transfer means in each zone so that within each zone the data transfer means will be cooperating with respect to a corresponding track in every other zone, a register means connected to each of said data transfer means to store an item to be manipulated with respect to said disc, means selectively coupling said register means to said data transfer means in accordance with the zones selected for a data transfer operation, said last-named means coupling data with respect to said register means so that an item of data for said register means will be divided into at least two sections, and means connected to said register means to shift the data therein at a rate corresponding to the zones selected for a data transfer.

8. Apparatus as defined in claim 7 wherein said register means, when connected to communicate data with respect to any two zones displaced from each other, provides data register space in varying amounts in accordance with the relative displacement of said two zones.

9. In combination, a data storage disc file comprising a rotatable storage element having a planar surface at right angles to the axis of rotation on which data is adapted to be stored, means defining on said element a plurality of circular data storage tracks each of which has a center common to the rotating axis of said element, data transfer means adapted to be associated with at least two of said tracks at the same time, said data transfer means comprising a pair of data transfer heads adapted to communicate electromagnetically with respect to said tracks, a data storage register means connected to said pair of data transfer heads, said register means being adapted to provide data for said data transfer means, and means connected to shift data within said register means to said heads so that the data in said register means will be transferred with respect to said element within a common angular sector and at the same transfer rate in two tracks.

10. In a digital data storage apparatus, the combination comprising, a rotatable disc storage file including at least one rotatable disc storage element having a planar surface at right angles to the rotational axis thereof on which data is adapted to be stored, said disc storage element being divided into a plurality of zones extending outwardly from the rotational axis on said disc, each of said zones including a plurality of circular tracks, a data transfer means for each zone and adapted to be positioned adjacent at least one track within said zone, mechanical means for positioning the data transfer means in each zone so that within each zone the data transfer means will be cooperating with respect to a corresponding track in every other zone, a register means connected at selected outputs to each of said data transfer means, means coupling said register means to said data transfer means in accordance with the zones selected for a data transfer operation, said last-named means coupling data with respect to said register means so that the item of data will be divided between at least two registers, means connected to said registers to shift the data in said registers at a rate corresponding to the peripheral movement of the disc with respect to the associated data transfer means so that there will be a uniform rate of data flow between said disc and said data transfer means, and means coupled to said selected outputs to divide the data transfer with respect to said register so that a transfer will be effected within a common angular sector on said element.

11. Apparatus for controlling the selection of predetermined storage locations in a plurality of data storage devices each having a finite search time for locating storage locations in each storage device which search time is variable at any one instant between each storage device comprising a desired address storage means and a present address indicator for each data storage device, address comparison means producing an indication of a deviation between a desired storage location and the present storage location of each storage device, and means producing a further indication of the storage device which will reach its desired address location first with respect to any other storage device so as to activate that storage device.

12. Apparatus for controlling the selection of predetermined storage locations in a plurality of dynamic data storage devices using a rotatable storage medium and a static data transfer means and having a finite search time for locating storage locations in each storage device which search time is variable at any one instant between each storage device comprising a desired address storage means and a present address indicator for each data storage device, a first address comparison means for each device connected to said desired address storage means and said present address indicator for producing an indication of a deviation from a desired storage location and the present storage location of each storage device, and a second comparison means connected to each of said first address comparison means for producing a further indication of the storage device which will reach its desired storage location first so as to activate that storage device prior to any other storage device.

13. Apparatus for use in manipulating digital data comprising a shift register divided into a plurality of separate sections, each of said sections having separate inputs and outputs for purposes of serially shifting in or serially shifting out digital data, a plurality of shift signal sources, and means selectively connecting predetermined combinations of shift signal sources to said register sections so that data in said register may be shifted at varying rates, in accordance with the operational requirements of an associated data utilization means.

14. Apparatus for use in manipulating digital data comprising a shift register divided into a plurality of separate sections, each of said sections having separate inputs and outputs at the ends thereof for purposes of serially shifting in or serially shifting out digital data, a separate shift signal source connected to each register section, said shift signal sources being adapted to shift varying combinations of said sections at different rates, a data storage file having the storage portion thereof divided into a plurality of pairs of storage locations uniquely related to the construction of the storage file, means connecting said shift register to transfer data with respect to a pair of storage locations in said storage file at rates dependent on the pair of storage locations selected, and means connecting said plurality of register sections to form two separate serial registers for use in the data transfer.

15. Apparatus for controlling a selection of predetermined storage locations in a plurality of asynchronously rotating data storage devices each having a finite search time for locating storage locations in each storage device which search time may be variable at any one instant between each storage device comprising a desired address storage register and a present address indicator register for each data storage device, comparison means for each storage device connected to said registers to produce an indication of a deviation from a desired storage location and the present address location in each storage device, and comparison means connected to the outputs of each of said first named comparison means to produce a control signal indicative of that storage device which will reach its desired location first in time.

No references cited

ROBERT C. BAILEY, *Primary Examiner.*

BERNARD KONICK, *Examiner.*

IRVING L. SRAGOW, R. ZACHE, *Assistant Examiners.*